US012809298B2

(12) United States Patent
Hiraike

(10) Patent No.: US 12,809,298 B2
(45) Date of Patent: Nov. 24, 2026

(54) IMAGE FORMING APPARATUS, CONTROL METHOD FOR IMAGE FORMING APPARATUS, AND STORAGE MEDIUM

(71) Applicant: CANON KABUSHIKI KAISHA, Tokyo (JP)

(72) Inventor: Kou Hiraike, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/084,929

(22) Filed: Mar. 20, 2025

(65) Prior Publication Data

US 2025/0306515 A1 Oct. 2, 2025

(30) Foreign Application Priority Data

Apr. 1, 2024 (JP) ................................ 2024-059138

(51) Int. Cl.

*G03G 15/00* (2006.01)
*G03G 15/16* (2006.01)
*G03G 21/12* (2006.01)

(52) U.S. Cl.

CPC ......... *G03G 15/553* (2013.01); *G03G 15/161* (2013.01); *G03G 15/162* (2013.01);
(Continued)

(58) Field of Classification Search

CPC ............... G03G 15/161; G03G 15/162; G03G 15/5016; G03G 15/553; G03G 15/556;
(Continued)

(56) References Cited

U.S. PATENT DOCUMENTS 4,791,454 A * 12/1988 Takahashi ............ G03G 21/007 399/113
2011/0026082 A1* 2/2011 Miyadera ............... H04N 1/506 358/3.24

(Continued)

FOREIGN PATENT DOCUMENTS

| | | |
|---|---|---|
| JP | 2009145820 A * | 7/2009 |
| JP | 2019031006 A | 2/2019 |
| JP | 2020197702 A | 12/2020 |

OTHER PUBLICATIONS

Machine translation of JP 2009-145820 A, published on Jul. 2, 2009 (Year: 2009).*

(Continued)

*Primary Examiner* — Sophia S Chen
(74) *Attorney, Agent, or Firm* — ROSSI, KIMMS & McDOWELL LLP

(57) ABSTRACT

An image forming apparatus can include an intermediate transfer unit including an intermediate transfer belt and a residual toner collecting container, a belt monitoring unit configured to detect a condition of the lifespan of the intermediate transfer belt, a full state detection unit configured to detect a full state of the residual toner collecting container, and a control unit configured to control an operation of the image forming apparatus based on detection of a full state of the residual toner collecting container by the full state detection unit before the belt monitoring unit detects reaching of an end of the lifespan of the intermediate transfer belt.

11 Claims, 12 Drawing Sheets

(52) U.S. Cl.
CPC ......... *G03G 15/5016* (2013.01); *G03G 21/12* (2013.01); *G03G 2221/1642* (2013.01); *G03G 2221/1663* (2013.01)

(58) Field of Classification Search
CPC ........... G03G 21/12; G03G 2221/1642; G03G 2221/1663
See application file for complete search history.

(56) References Cited

U.S. PATENT DOCUMENTS

| | | | | |
|---|---|---|---|---|
| 2013/0028625 A1* | 1/2013 | Ando | G03G 15/556 | 399/72 |
| 2013/0302065 A1* | 11/2013 | Mori | G03G 15/161 | 399/124 |

OTHER PUBLICATIONS

Machine translation of JP 2009-145820 A, published on Jul. 2, 2009.*

* cited by examiner

FIG. 6A

| WARNING DISPLAY OF TRANSFER UNIT (TRANSFER BELT) |
|---|
| OFF |
| ON |
| |

FIG. 6B

| END OF LIFESPAN OPERATION OF TRANSFER UNIT (TRANSFER BELT) |
|---|
| CONTINUE |
| SUSPEND |
| STOP |

FIG. 6C

| END OF LIFESPAN DISPLAY OF TRANSFER UNIT (TRANSFER BELT) |
|---|
| OFF |
| ON |
| |

FIG. 6D

| WARNING OPERATION OF TRANSFER UNIT (RESIDUAL TONER) |
|---|
| CONTINUE |
| SUSPEND |
| STOP |

FIG. 6E

| WARNING DISPLAY OF TRANSFER UNIT (RESIDUAL TONER) |
|---|
| OFF |
| ON |
| |

IMAGE FORMING APPARATUS, CONTROL METHOD FOR IMAGE FORMING APPARATUS, AND STORAGE MEDIUM

BACKGROUND OF THE INVENTION

Field of the Invention

The present invention relates to an image forming apparatus, a control method for an image forming apparatus, and a storage medium.

Widely known consumables of an image forming apparatus include a process cartridge that is an all-in-one cartridge in which toner, a photosensitive drum, a developer, and the like are integrated.

Description of the Related Art

Japanese Patent Laid-Open No. 2019-031006 proposes setting operation at a life arrival time in each element of detachable consumables on the basis of operation through the setting screen of an operation panel.

Japanese Patent Laid-Open No. 2020-197702 proposes improving a filling factor by arranging, in an internal region of an intermediate transfer belt, a residual toner collecting container remaining on the intermediate transfer belt of an image forming apparatus, and moving the transfer residual toner to the center of the container via a conveyance member.

In a known image forming apparatus, residual toner generated at the time of printing has been stored in a toner cartridge or stored in a gathered toner dedicated container. When the toner is stored in the toner cartridge, a gathered toner storage area is sufficiently prepared from the ratio between consumed toner and gathered toner, whereby the gathered toner has not been in a full state until the toner is used up. When the gathered toner dedicated container is provided, the residual toner can be sufficiently collected by increasing the filling factor of the residual toner so that the residual toner collecting container does not become full.

In the image forming apparatus, when printing is repeated, the intermediate transfer belt reaches the end of its lifespan and the residual toner collecting container becomes full. Therefore, it is necessary to replace the intermediate transfer belt and the residual toner collecting container. When the residual toner collecting container remaining on the intermediate transfer belt is arranged in the internal region of the intermediate transfer belt, it is difficult to increase the capacity due to space limitation. The intermediate transfer belt and the residual toner collecting container arranged in the internal region of the intermediate transfer belt can constitute an intermediate transfer unit, and the intermediate transfer unit can be replaceable with the image forming apparatus. In this case, the residual toner collecting container cannot be replaced alone, and the intermediate transfer unit needs to be replaced together with the intermediate transfer belt. When the intermediate transfer belt reaches the end of its lifespan, printing can be continued even if the print image quality is deteriorated. On the other hand, when the residual toner collecting container is full, the residual toner overflows, and thus it is necessary to stop printing. Depending on the use method of the image forming apparatus, the residual toner collecting container may be full before the intermediate transfer belt reaches the end of its lifespan.

SUMMARY OF THE INVENTION

The present invention enables realization of a technique of appropriately controlling replacement time of an intermediate transfer belt in an image forming apparatus from which an intermediate transfer unit including the intermediate transfer belt and a residual toner collecting container is removable.

One aspect of the present invention provides an image forming apparatus comprising: an intermediate transfer unit including an intermediate transfer belt and a residual toner collecting container; a belt monitoring unit configured to detect a condition of the lifespan of the intermediate transfer belt; a full state detection unit configured to detect a full state of the residual toner collecting container; and a control unit configured to control an operation of the image forming apparatus based on detection of a full state of the residual toner collecting container by the full state detection unit before the belt monitoring unit detects reaching of an end of the lifespan of the intermediate transfer belt.

Another aspect of the present invention provides a control method for an image forming apparatus removably comprising an intermediate transfer unit including an intermediate transfer belt and a residual toner collecting container, the method comprising: detecting a condition of the lifespan of the intermediate transfer belt; detecting a full state of the residual toner collecting container; and controlling an operation of the image forming apparatus based on detection of a full state of the residual toner collecting container before detection of reaching of an end of the lifespan of the intermediate transfer belt.

Still another aspect of the present invention provides a non-transitory computer-readable storage medium, the storage medium storing a program for causing a computer to execute each step of a method of controlling an image forming apparatus removably comprising an intermediate transfer unit including an intermediate transfer belt and a residual toner collecting container, the method comprising: detecting a condition of the lifespan of the intermediate transfer belt; detecting a full state of the residual toner collecting container; and controlling an operation of the image forming apparatus based on detection of a full state of the residual toner collecting container before detection of reaching of an end of the lifespan of the intermediate transfer belt.

Further features of the present invention will become apparent from the following description of exemplary embodiments (with reference to the attached drawings).

BRIEF DESCRIPTION OF THE DRAWINGS

FIG. 1 is a view illustrating a hardware configuration of an image forming apparatus and the like.

FIG. 2 is a view illustrating a hardware configuration of a controller and the like.

FIG. 3 is a view illustrating a hardware configuration of a print engine and the like.

FIGS. 6A to 6E are UI examples of display and operation setting.

DESCRIPTION OF THE EMBODIMENTS

Figure 1:
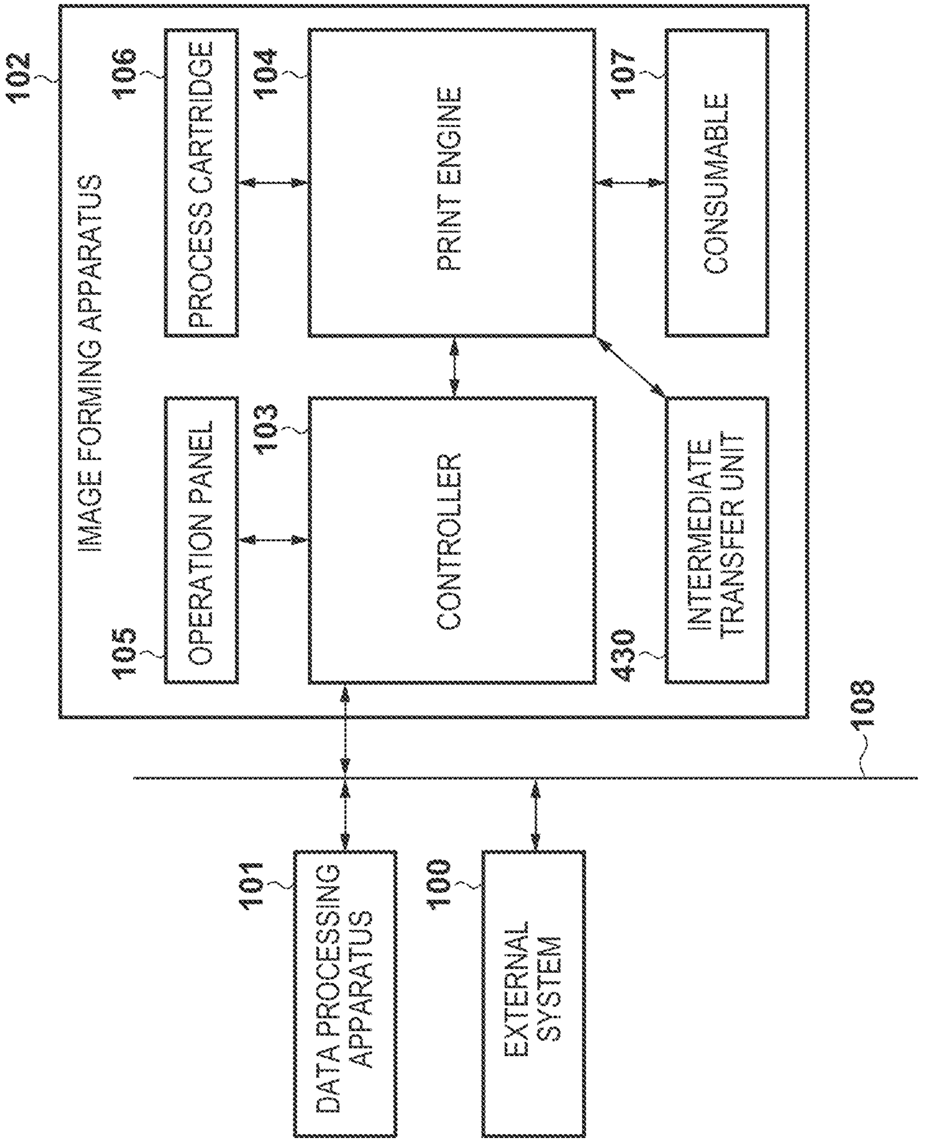

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In the following, one embodiment of the present invention will be described. First, a hardware configuration example of an image forming apparatus 102 according to the present embodiment will be described with reference to FIG. 1.

In the image forming apparatus 102, a data processing apparatus 101 and an external system 100 are connected via a network such as a LAN 108.

The image forming apparatus 102 includes a controller 103, a print engine 104, an operation panel 105, a process cartridge 106, and a consumable 107.

The external system 100 acquires information regarding the states of the process cartridge 106, the consumable 107, and an intermediate transfer unit 430 that are removable from the image forming apparatus 102.

The data processing apparatus 101 (e.g., PC) generates image data and transmits the generated image data to the image forming apparatus 102.

The process cartridge 106, which is removable, is an example of a removable consumable.

The image forming apparatus 102 (e.g., laser printer) receives image data from the data processing apparatus 101 and forms an image on a sheet based on the received image data. The image forming apparatus 102 may be a multifunction peripheral having a scanner function or a facsimile function.

The controller 103 generates bitmap data based on PDL data, and transmits the generated bitmap data to the print engine 104. Details of the controller 103 will be described later with reference to FIG. 2.

The print engine 104 forms an image on a sheet using toner by an electrophotographic method based on the bitmap data received from the controller 103. In the present embodiment, the controller 103 and the print engine 104 are separated from each other, but may be integrated.

The operation panel 105 is a user interface, and includes a display unit that conveys various information to the user and an operation unit that receives various operations from the user. The operation panel 105 includes a touch screen display, as an example.

The process cartridge 106 is a consumable in which toner, a photosensitive drum, a developer, and the like are integrated, and is removable from the image forming apparatus 102. The process cartridge 106 may have a separate configuration such as a toner cartridge and a drum cartridge.

The consumable 107 is a consumable other than the process cartridge 106, is, for example, a fixer or a paper feed roller, and is removable from the image forming apparatus 102. In the intermediate transfer unit 430, a residual toner collecting container 439 is arranged in an internal region of an intermediate transfer belt 435, and is removable from the image forming apparatus 102.

Figure 2:
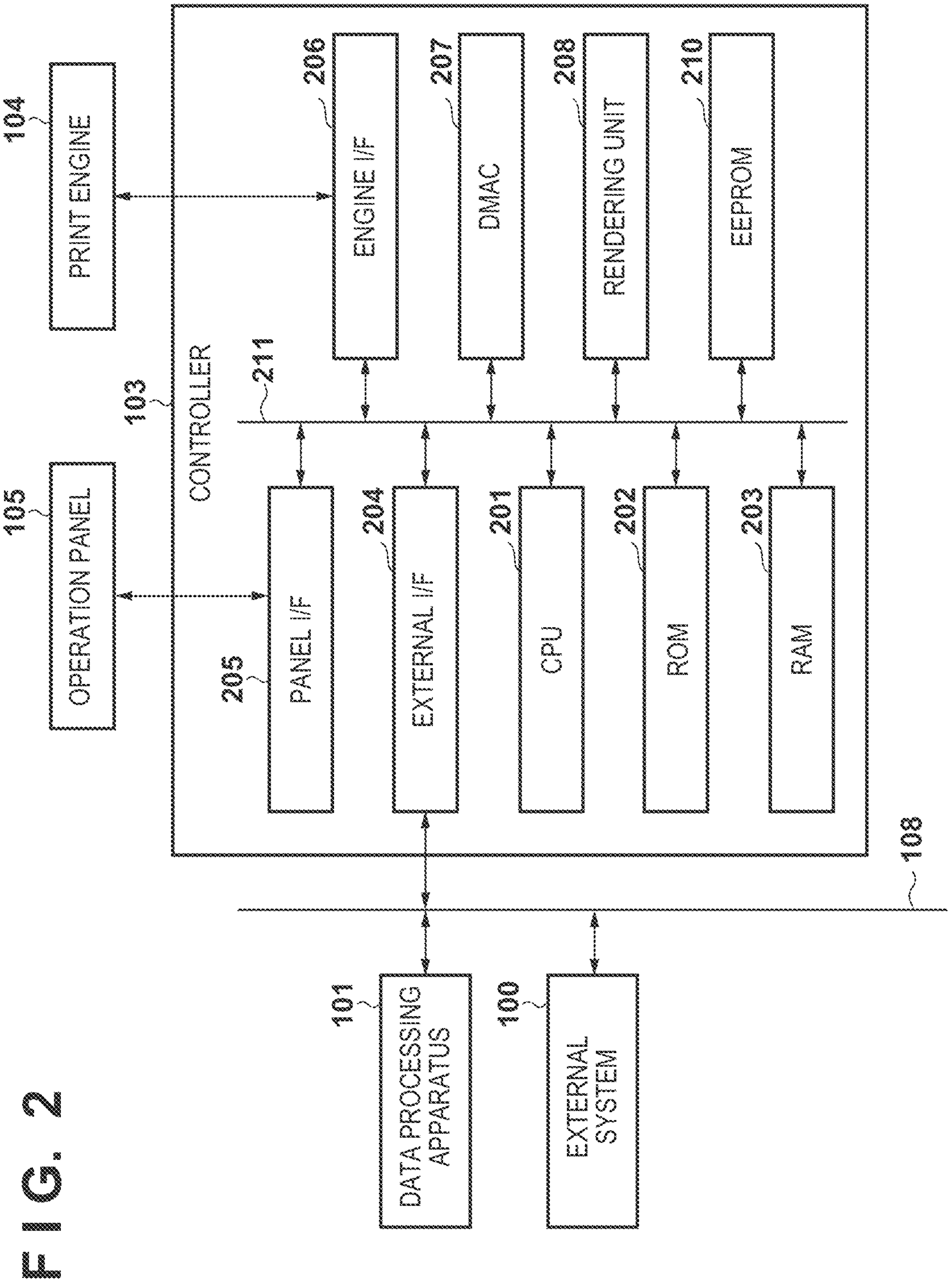

Next, an example of a hardware configuration of the controller and the like will be described with reference to FIG. 2.

The controller 103 includes a central processing unit (CPU) 201, a read only memory (ROM) 202, a random access memory (RAM) 203, an external I/F 204, a panel I/F 205, an engine I/F 206, a DMAC 207, a rendering unit 208, and an EEPROM 210. The configuration elements in the controller 103 are interconnected by a bus 211.

The controller 103 including the CPU 201 controls the entire operation of the image forming apparatus 102. The CPU 201 develops a program stored in the ROM 202 into the RAM 203, executes processing based on the developed program, and controls the image forming apparatus 102. The ROM 202 stores programs and the like to be executed by the CPU 201.

The RAM 203 stores programs and the like developed from the ROM 202. The RAM 203 also stores PDL data, intermediate data generated by interpreting the PDL data, bitmap data generated by rendering the intermediate data, various temporary processing statuses and log information necessary for other processing, and the like.

The external I/F 204 is an interface that interconnects the external system 100 and the data processing apparatus 101 and the controller 103 via the LAN 108 and relays data communication between the two, that is, transmission and reception of data. In the present embodiment, a case where the external I/F 204 communicates with the external system 100 and the data processing apparatus 101 via the LAN 108 is exemplified, but the present invention is not limited to this. For example, the external I/F 204 may communicate with the external system 100 and the data processing apparatus 101 via a wireless network or the like. The external I/F 204 may be connected via another protocol (e.g., USB).

The panel I/F 205 is an interface that interconnects the operation panel 105 and the controller 103. The CPU 201 controls a screen displayed on the operation panel 105 via the panel I/F 205. The CPU 201 detects, via the panel I/F 205, a user operation through the operation panel 105.

The engine I/F 206 interconnects the print engine 104 and the controller 103. The CPU 201 transmits and receives data and control commands to and from the print engine 104 via the engine I/F 206.

The DMAC 207 receives a command from the CPU 201, and performs data access, that is, writing and reading of data to and from the RAM 203.

The rendering unit 208 develops intermediate data into bitmap data.

The EEPROM 210 is an electrically erasable programmable read-only memory, and stores setting information and the like of the image forming apparatus 102.

Figure 3:
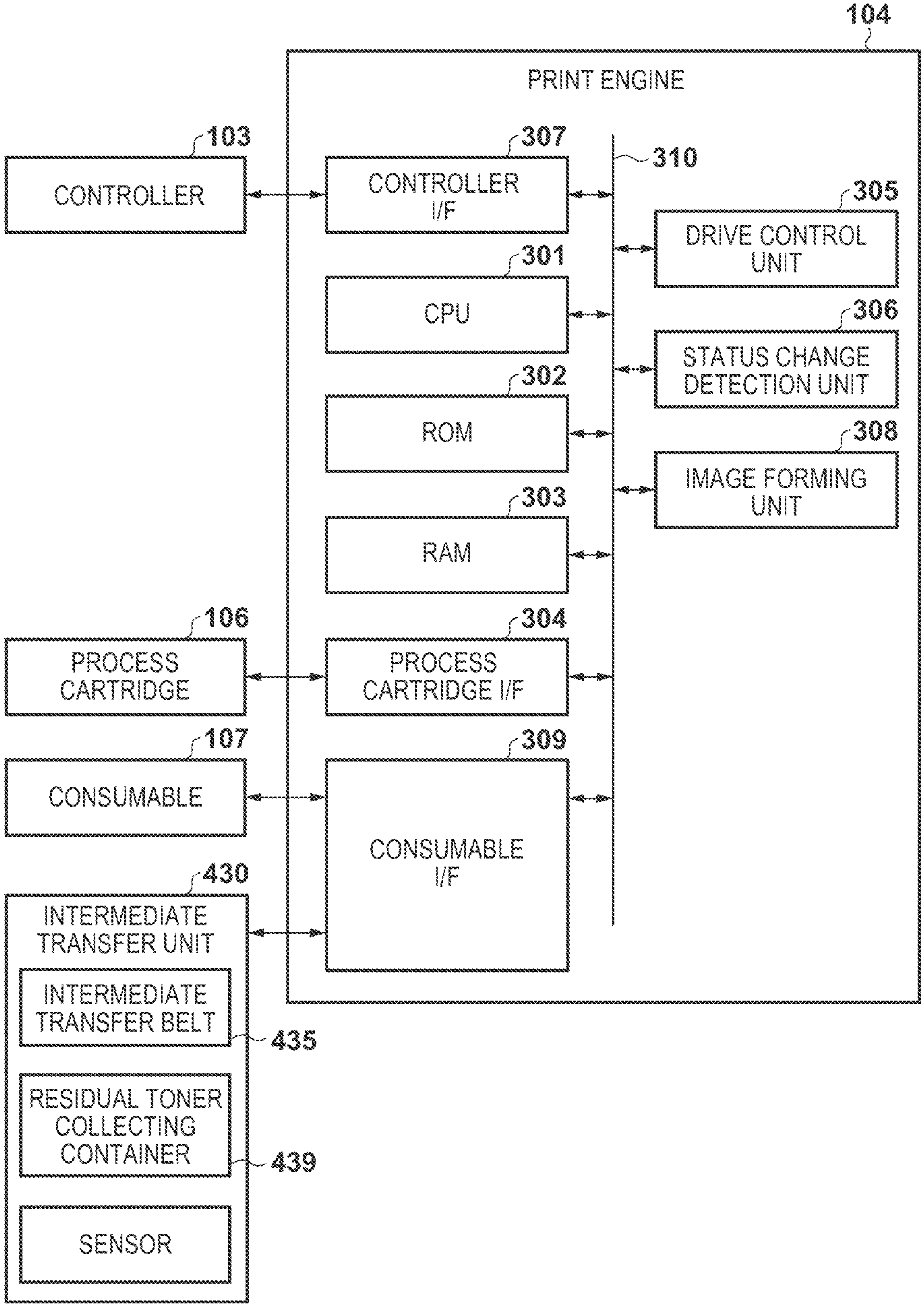

An example of a hardware configuration of the print engine and the like will be described with reference to FIG. 3.

The print engine 104 includes a CPU 301, a ROM 302, a RAM 303, a process cartridge I/F 304, a drive control unit 305, a status change detection unit 306, a controller I/F 307, an image forming unit 308, and a consumable I/F 309. The configuration elements in the print engine 104 are interconnected by a bus 310.

The CPU 301 develops a program stored in the ROM 302 into the RAM 303, executes the program, and controls the print engine 104. The ROM 302 stores programs and the like to be executed by the CPU 301. The RAM 303 stores programs and the like developed from the ROM 302.

The process cartridge I/F 304 interconnects the process cartridge 106 and the print engine 104, and transmits and receives information on each unit of the process cartridge 106.

The drive control unit 305 drives various motors necessary for the image forming unit 308 to form an image.

The status change detection unit 306 detects a status change such as a jam or a cover open in the image forming apparatus 102. Detection of the status change may be performed by the CPU 301.

The controller I/F 307 interconnects the controller 103 and the print engine 104, and relays data communication between the two, that is, transmission and reception of data.

Based on the bitmap data received from the controller 103, the image forming unit 308 forms an image on a sheet using toner by an electrophotographic method.

The consumable I/F 309 interconnects a fixer, a paper feed roller, and the like that are consumables removable from the image forming apparatus 102 other than the process cartridge 106 and the print engine 104, and transmits and receives information on each unit of the consumable 107. The consumable I/F 309 is interconnected also to the intermediate transfer unit 430 in which the residual toner collecting container 439 is arranged in the internal region of the intermediate transfer belt 435, and transmits and receives information on each unit of the intermediate transfer unit 430. The intermediate transfer unit 430 holds a sensor for detecting the end of the lifespan of the intermediate transfer belt 435 and the full state of the residual toner collecting container 439, and a memory for counting and storing the moving distance or the cumulative rotation number of the intermediate transfer belt 435 or the total number of printed sheets. Then, the intermediate transfer unit 430 transmits and receives these sensor values and memory values to and from the consumable I/F 309 as information.

The internal configuration and operation of the image forming apparatus 102 will be described with reference to FIG. 4.

The image forming apparatus 102 is what is called a tandem type image forming apparatus including a plurality of image forming units 411 to 414. The image forming unit 411 forms an image with toner of yellow (Y), the image forming unit 412 with magenta (M), the image forming unit 413 with cyan (C), and the image forming unit 414 with black (Bk).

The image forming apparatus 102 is of a process cartridge type, and each of the plurality of image forming units 411 to 414 is configured as a process cartridge and is removable from the main body of the image forming apparatus. Note that detachment or attachment of each process cartridge is performed in a state where an open/close door 401 provided in the image forming apparatus is opened. The four image forming units are arranged in a line at regular intervals, and the configuration of each image forming unit is mostly common except for the color of the toner to be collected. The image forming units 411 to 414 are arranged side by side horizontally with respect to the bottom surface of the image forming apparatus 102.

The image forming units 411 to 414 include an electrophotographic process mechanism, and a rotational driving force is transmitted from a cartridge drive transmission unit not illustrated provided in the image forming apparatus. The image forming units 411 to 414 include photosensitive drums 421 to 424 that generate a toner image, a charging unit (not illustrated), and a developing unit (not illustrated).

An exposure unit 402 is provided above the image forming units 411 to 414, and the exposure unit 402 outputs laser light corresponding to image information received by a controller not illustrated.

The laser light output from the exposure unit 402 passes through exposure window portions of the image forming units 411 to 414 and scans and exposes the surfaces of the photosensitive drums 421 to 424.

The intermediate transfer unit 430 includes primary transfer rollers 431 to 434, the intermediate transfer belt 435 that is movable and endless, a driving roller 436, stretch rollers 437 and 438, and the residual toner collecting container 439. By rotating by receiving the driving force, the driving roller 436 moves the intermediate transfer belt 435 in the direction of the arrow in the drawing, and stretches the intermediate transfer belt 435 together with the stretch rollers 437 and 438.

A residual toner gathering unit 450 gathers the toner remaining in the intermediate transfer belt 435, and the gathered toner is collected in the residual toner collecting container 439 provided in an inner peripheral region of the intermediate transfer belt 435.

The primary transfer rollers 431 to 434 are transfer units for transferring, to the intermediate transfer belt 435, the toner image formed on the photosensitive drums 421 to 424, and are in contact with the inner peripheral surface of the intermediate transfer belt 435. The primary transfer rollers 431 to 434 are provided corresponding to the respective photosensitive drums 421 to 424 via the intermediate transfer belt 435.

Regarding conveyance of printing paper 440, the image forming apparatus 102 includes a paper feed cassette 441 that collects the printing paper, and a paper feed roller 442 that feeds the printing paper from the paper feed cassette 441 toward a secondary transfer unit. The image forming apparatus 102 includes a fixing unit 443 that fixes a toner image on the printing paper 440 and a discharge roller 444 that discharges the printing paper on which the toner image is fixed, and the discharged printing paper is stacked on a paper discharge tray 445.

The printing paper 440 collected in the paper feed cassette 441 is fed from the paper feed cassette 441 by the paper feed roller 442 at a predetermined timing and conveyed toward the secondary transfer unit. Then, in the secondary transfer unit, the toner images of the four colors transferred onto the intermediate transfer belt 435 are secondarily transferred onto the printing paper 440. The printing paper 440 on which the toner images of the four colors have been secondarily transferred is heated and pressurized by the fixing unit 443, whereby the toner of the four colors are melted and mixed to be fixed on the printing paper 440. Thereafter, the printing paper 440 is discharged by the discharge roller 444 and is stacked on the paper discharge tray 445 as a stack unit.

The residual toner gathering unit 450 includes a cleaning blade (collection member). The cleaning blade is arranged so as to abut against the outer peripheral surface of the intermediate transfer belt 435 in a counter direction facing the moving direction of the intermediate transfer belt 435, and gathers the residual toner remaining on the intermediate transfer belt 435. A conveyance member 451 including a spiral conveyance unit in the axial direction of a rotation axis rotates by receiving the driving force from the driving roller 436, whereby the residual toner gathered by the cleaning blade is conveyed and collected in the residual toner collecting container 439.

The intermediate transfer unit 430 in which a container collecting residual toner is arranged in the internal region of the intermediate transfer belt 435 is removable from the main body front surface or the main body back surface of the image forming apparatus 102. By opening an open/close door on the front surface of the main body or the back surface not illustrated, insertion and removal operation of the intermediate transfer unit 430 is possible, and the intermediate transfer unit 430 can be attached and detached.

When the intermediate transfer belt 435 reaches the end of its lifespan or when the residual toner is full, both can be replaced simultaneously by replacing the intermediate transfer unit 430.

This can reduce the labor of the replacement work by the user or the service person and improve the usability. Furthermore, by arranging the residual toner collecting container 439 in the internal region of the intermediate transfer belt 435, it is possible to reduce a space in which the collecting container is arranged and achieve downsizing of the image forming apparatus.

Next, information processing of the controller 103 will be described with reference to FIGS. 5A and 5B.

The processing described below is implemented, for example, by the CPU 201 of the controller 103 reading a program stored in the ROM 202 into the RAM 203 and executing the program. Hereinafter, the step number of each processing included in the flowchart is indicated by a number starting with “S”. The same applies to the subsequent flowcharts.

In the present embodiment, control when the intermediate transfer belt 435 reaches the end of its lifespan and the residual toner collecting container 439 is full will be described as a target.

The end of the lifespan of the intermediate transfer belt 435 means that the intermediate transfer belt 435 has been used up to a state in which the print performance of the image forming apparatus 102 cannot be guaranteed.

Repeating of printing causes wear of the intermediate transfer belt 435, and therefore it is determined that the intermediate transfer belt 435 reaches the end of its lifespan when the moving distance or the cumulative rotation number of the intermediate transfer belt 435 or the total number of printed sheets exceeds a preset threshold. A wear detection sensor may detect the degree of wear of the intermediate transfer belt 435, and determine that the intermediate transfer belt 435 has reached the end of its lifespan when the intermediate transfer belt 435 is brought into a state of a certain amount of wear. The print engine 104 determines the lifespan state of the intermediate transfer belt 435 based on these. The means for determining the lifespan state by the print engine 104 is an example of the belt monitoring unit in the present invention, but is not limited to this. The controller 103 and the print engine 104 may be integrated, and the controller 103 may detect the lifespan state. The belt monitoring unit may detect a remaining moving distance or a number of rotations until the end of the lifespan or may detect a remaining lifespan that is the number of printed sheets.

In order to purchase and arrange a replacement of the intermediate transfer unit 430 before reaching the end of its lifespan, it is also possible to warn that the moving distance, the cumulative rotation number, or the total number of printed sheets is about to be brought into a state of exceeding the preset threshold, or the wear detection sensor is about to be brought into a state of detecting. The notification of the warning state can be issued by the print engine 104 or the controller 103. These warning states can be determined at a rate indicated by % with respect to a preset threshold.

Next, the full state of the residual toner collecting container 439 means that the toner is used until printing cannot be continued in the image forming apparatus 102. When the residual toner collecting container 439 is full, the residual toner of the intermediate transfer belt 435 cannot be gathered, and the toner flows back and the residual toner flies inside the image forming apparatus 102, which leads to a failure of the image forming apparatus 102. Therefore, the full state is detected before the residual toner overflows from the residual toner collecting container 439.

Figure 4:
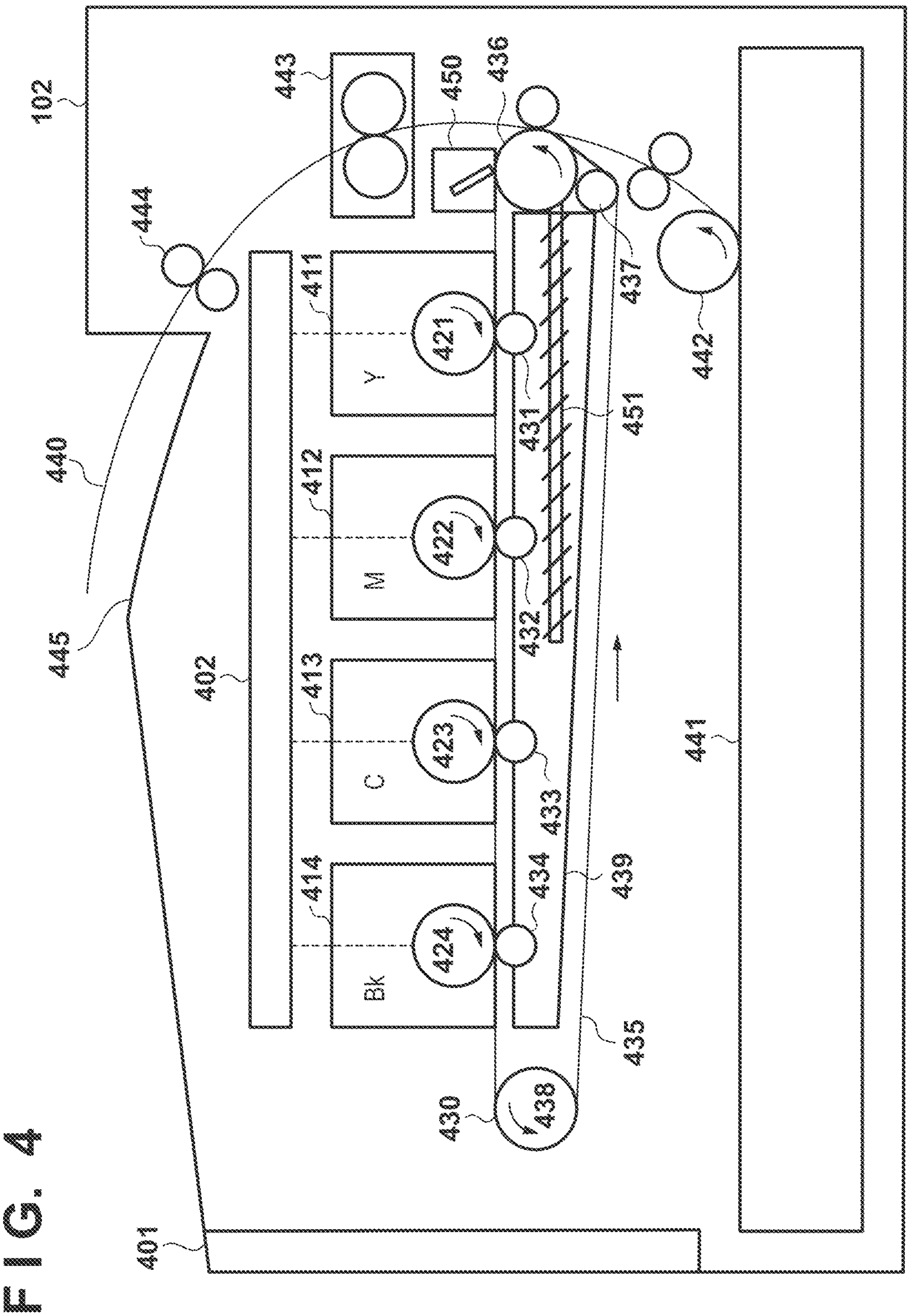
FIG. 4 is a schematic cross-sectional view illustrating an internal configuration of the print engine.

When the filling factor of the residual toner to the residual toner collecting container 439 increases and the collecting container is brought into a full state, the rotation of the conveyance member 451 of FIG. 4 slows down by receiving the resistance from the filled residual toner. When the rotation of the conveyance member 451 slows down, the speeds of the driving roller 436 and the intermediate transfer belt 435 decelerate. The decelerations of the driving roller 436 and the intermediate transfer belt 435 are detected by a sensor, thereby detecting that the residual toner collecting container 439 is in the full state.

The print engine 104 determines whether the residual toner collecting container 439 is in a full state based on a measurement value of the sensor or the like. In the print engine 104, the unit that determines that the residual toner collecting container 439 is in a full state is an example of the full state detection unit in the present invention, but is not limited to this. The controller 103 and the print engine 104 may be integrated, and the controller 103 may detect the full state.

In order to purchase and arrange a replacement of the intermediate transfer unit 430 before detecting the full state, it is also possible to warn that the residual toner collecting container 439 is about to be brought into a full state. The notification of the warning state can be issued by the print engine 104 or the controller 103.

Information processing of the image forming apparatus according to the present embodiment will be described with reference to FIGS. 5A and 5B. The control shown in the flowchart shown in FIGS. 5A and 5B is implemented in the controller 103 by the CPU 201 developing a control program stored in the ROM 202 into the RAM 203 and executing the control program. Hereinafter, the step number of each processing included in the flowchart is indicated by a number starting with “S”. The same applies to the subsequent flowcharts.

In S501, S511, S521, and S531, a warning notification or an end of lifespan notification of the intermediate transfer belt 435 and a warning notification or a full state notification of the residual toner collecting container 439 are issued from the print engine 104 to the controller 103 at the time of activation, return to sleep, or printing. The controller 103 and the print engine 104 may be integrated, and the controller 103 may issue the warning notification and the end of lifespan notification of the intermediate transfer belt 435, and the full state detection and the warning notification of the residual toner collecting container 439.

The warning notification of the intermediate transfer belt 435 in S501 and the end of lifespan notification of the intermediate transfer belt 435 in S511 are issued when the moving distance or the cumulative rotation number of the belt or the total number of printed sheets exceeds the preset threshold. In addition, the warning notification and the end of lifespan notification are issued when the sensor of the intermediate transfer belt 435 detects the degree of wear, elongation, deflection, or the like of the intermediate transfer belt 435. The end of lifespan notification is issued when the threshold of the moving distance or the cumulative rotation number of the intermediate transfer belt 435 or the total number of printed sheets reaches the upper limit value of the lifespan of the single component of the intermediate transfer belt 435, and the warning notification is issued when it reaches 80% of the upper limit value, for example. The end of lifespan notification is issued when the detection of the degree of wear, elongation, or deflection of the belt by the sensor reaches the upper limit value of thinness, an elongation amount, or a deflection amount, and the warning notification is issued when it reaches 80% of the upper limit value, for example.

The remaining lifespan is a moving distance or a rotation number, or the number of printed sheets until each of the moving distance or the cumulative rotation number of the belt or the total number of printed sheets reaches the preset threshold. The remaining lifespan is not limited to this, and may be the time until reaching the end of lifespan based on the usage state, or the ratio of the remaining. For example, when the moving distance, the cumulative rotation number, or the total number of printed sheets reaches the threshold, the remaining lifespan becomes 0%, and when it reaches 80% of the threshold, the remaining lifespan becomes 20%. In the present invention, a state related to the lifespan associated with use of the intermediate transfer belt 435, including all remaining lifespan in cases of reaching the end of the lifespan or cases of being about to reach the end of lifespan, is called a lifespan state.

Note that although the warning notification is issued in a case of reaching 80% of the upper limit value, a value other than 80% may be set. Regarding the warning notification of the residual toner in S521 and the end of lifespan notification of the residual toner in S531, the end of lifespan notification is issued when the sensor for detecting the full state of the residual toner collecting container 439 reaches the upper limit value, and the warning notification is issued when it reaches 80% of the upper limit value, for example. Note that although the warning notification is issued in a case of reaching 80% of the upper limit value, a value other than 80% may be set.

In S501, if there is a warning notification of the intermediate transfer belt 435 (Yes), the process proceeds to S502, and if there is no warning notification (No), the process proceeds to S511. In S502, the CPU 201 determines whether or not the warning display of the intermediate transfer belt 435 is set. The setting of the warning display is performed through the operation of the operation panel 105, and is set on a setting screen illustrated in FIG. 6A described later, for example. If determining that the warning display of the intermediate transfer belt 435 is set, that is, the warning display is set to ON, the CPU 201 proceeds to S503 (Yes in S502). If determining that the warning display of the intermediate transfer belt 435 is not set, that is, the warning display is set to OFF, the CPU 201 proceeds to S511 (No in S502).

In S503, the CPU 201 controls the warning display of the intermediate transfer belt 435. The CPU 201 controls the operation panel 105 so as to display a warning display screen that displays a warning indicating that the end of lifespan of the intermediate transfer belt 435 is approaching, illustrated in FIG. 7A described later, for example.

If there is an end of lifespan notification of the intermediate transfer belt 435 in S511, the process proceeds to S512 (Yes in S511), and if there is no end of lifespan notification, the process proceeds to S521 (No in S511). In S512, the CPU 201 determines whether or not the end of lifespan operation of the intermediate transfer belt 435 is set. The end of lifespan operation is an operation of stopping the printing operation until the intermediate transfer unit 430 is replaced, suspending the printing operation, and continuing printing. The end of lifespan operation of the intermediate transfer belt 435 is set through the operation of the operation panel 105, and is set on the setting screen illustrated in FIG. 6B described later, for example.

If determining that the end of lifespan operation is set to "suspend" or "stop", the CPU 201 proceeds to S513 (Yes in S512). On the other hand, if determining that the end of lifespan operation is set to "continue", the printing operation is continued without stopping the printing, and the process proceeds to S514 (No in S512).

In S513, the CPU 201 controls the set end of lifespan operation of the intermediate transfer belt 435. Since the end of lifespan operation is set to "suspend" or "stop", the printing operation is stopped. Then, the CPU 201 stops the printing operation, and controls the operation panel 105 so as to display an end of lifespan operation screen for prompting purchase and arrangement of a replacement of the intermediate transfer unit 430, illustrated in FIG. 7B described later, for example.

When "suspend" is set, the temporary stop can be canceled from the operation panel 105 to continue printing. Note that when "suspend" is canceled, the screen of the end of lifespan operation of FIG. 7B may not be redisplayed until the power supply of the image forming apparatus 102 is turned off. On the other hand, when "stop" is set, the intermediate transfer unit 430 is replaced, and printing remains stopped until it can be detected that the end of lifespan notification has been canceled. Then, the process proceeds to S514.

In S514, it is determined whether or not the display of the intermediate transfer belt lifespan is set. If it is determined that the display of the intermediate transfer belt lifespan is set (ON), the process proceeds to S515 (Yes in S514), and if it is determined that the display is not set (OFF), the process proceeds to S521 (No in S514). The display of the intermediate transfer belt lifespan is set on a setting screen illustrated in FIG. 6C described later, for example, through the operation panel 105.

In S515, the CPU 201 controls the end of lifespan display of the intermediate transfer belt 435. The CPU 201 controls the operation panel 105 so as to display an end of lifespan display screen illustrated in FIG. 7C described later, for example. Printing is enabled even when the end of lifespan display screen is displayed, but the intermediate transfer belt 435 has reached the end of lifespan, and therefore the print quality is deteriorated or a printing defect occurs. Then, the process proceeds to S521.

If there is a warning notification of the residual toner collecting container 439 in S521, the process proceeds to S522 (Yes in S521), and if there is no warning notification, the process proceeds to S531 (No in S521).

In S522, the CPU 201 determines whether or not the warning operation of the residual toner collecting container 439 is set. The warning operation is an operation of stopping the printing operation until the intermediate transfer unit 430 is replaced, suspending the printing operation, and continuing printing. The warning operation is set on a setting screen of FIG. 6D described later through the operation panel 105.

If the warning operation is set, that is, when it is determined in S522 that the warning operation is set to "suspend" or "stop", the process proceeds to S523 (Yes in S522). On the other hand, if the warning operation is not set, that is, when it is determined that the warning operation is set to "continue", the process proceeds to S524 (No in S522).

In S523, the CPU 201 controls a warning operation of the residual toner collecting container 439. Since the warning operation is set to "suspend" or "stop", the printing operation is stopped. Then, the CPU 201 stops the printing operation, and controls the operation panel 105 so as to display a warning operation screen for prompting purchase and arrangement of a replacement of the intermediate transfer unit 430, illustrated in FIG. 7D described later, for example. When "suspend" is set, it is possible to cancel the suspension from the operation panel 105 and continue printing. Note that when suspension is canceled, the warning operation screen may not be redisplayed until the power supply of the image forming apparatus 102 is turned off. On the other hand, when "stop" is set, the intermediate transfer unit 430 is replaced, and printing remains stopped until it can be detected that the warning notification has been canceled. Then, the process proceeds to S524.

In S524, the CPU 201 determines whether or not the warning display of the residual toner collecting container 439 is set. The warning display of the residual toner collecting container 439 is set on a setting screen illustrated in FIG. 6E described later, for example, through the operation panel 105. If the warning display is set, that is, if determining that the warning display is set to ON, the CPU 201 proceeds to S525 (Yes in S524). On the other hand, if the warning display is not set, that is, if it is determined that the warning display is set to OFF, the process proceeds to S531 (No in S524).

In S525, the warning display of the residual toner is performed. The CPU 201 controls the operation panel 105 so as to display a warning display screen illustrated in FIG. 7E described later, for example. Printing is enabled even when the warning display screen is displayed, but the full state of the residual toner collecting container 439 is approaching, and therefore the full state will eventually occur if it is continuously used. Then, the process proceeds to S531.

If there is a full state notification of the residual toner collecting container 439 in S531, the process proceeds to S532 (Yes in S531). If there is no full state notification, the flow ends. In S532, the CPU 201 controls the full state operation of the residual toner collecting container 439. The full state operation is an operation of stopping the printing operation until the intermediate transfer unit 430 is replaced. The CPU 201 stops the printing operation, and controls the operation panel 105 so as to display a full state operation screen for prompting purchase and arrangement of a replacement of the intermediate transfer unit 430, illustrated in FIG. 7F described later, for example. Then, the intermediate transfer unit 430 is replaced, and the printing stop is continued until it can be detected that the full state notification has been canceled.

FIGS. 6A to 6E illustrate UI examples of the setting of the lifespan of the intermediate transfer belt 435 and the setting when the residual toner collecting container 439 is full. UIs (setting screens) illustrated in FIGS. 6A to 6E are displayed on the operation panel 105.

FIG. 6A is a setting UI example of the presence or absence of the warning screen display when there is a warning notification of the end of the lifespan of the intermediate transfer belt 435. FIG. 6A illustrates a state in which "ON" is selected.

FIG. 6B is a setting UI example of the end of lifespan operation screen display when there is an end of lifespan notification of the intermediate transfer belt 435. FIG. 6B illustrates a UI example in which "continue" in which printing is not stopped when there is an end of lifespan notification, "suspend" in which printing is enabled by the user operation after suspending, and "stop" in which all subsequent printing operations are not permitted can be selected. FIG. 6B illustrates a state in which "suspend" is selected.

FIG. 6C is a setting UI example of the presence or absence of the end of lifespan screen display when there is an end of lifespan notification of the intermediate transfer belt 435. FIG. 6C illustrates a state in which "ON" is selected.

FIG. 6D is a setting UI example of the warning operation screen display when there is a warning notification of the full state of the residual toner collecting container 439. FIG. 6D illustrates a UI example in which "continue" in which printing is not stopped when there is a warning notification, "suspend" in which printing is enabled by the user operation after suspending, and "stop" in which all subsequent printing operations are not permitted can be selected. FIG. 6D illustrates a state in which "suspend" is selected.

FIG. 6E is a setting UI example of the presence or absence of the warning screen display when there is a warning notification of the full state of the residual toner collecting container 439. FIG. 6E illustrates a state in which "ON" is selected.

In the setting UIs of FIGS. 6A to 6E, it is also possible to switch the presence or absence of the display of the setting UIs according to the presence or absence of maintenance contract. When no maintenance contract is signed, the intermediate transfer unit 430 is purchased through general sales, and therefore it is possible to prompt the user to purchase and replace the intermediate transfer unit 430 by making the lifespan of the intermediate transfer belt 435 and the full state display and operation of the residual toner collecting container 439 settable. On the other hand, when the maintenance contract is signed, the intermediate transfer unit 430 can be delivered before the intermediate transfer belt 435 reaches the end of lifespan or the full state of the residual toner collecting container 439 occurs. Therefore, the setting may be fixed such that the display and the operation are performed only at the timing to be replaced, for example. When the maintenance contract is signed, the external system 100 of FIGS. 1 and 2 periodically acquires information on the lifespan of the intermediate transfer belt 435 and the full state of the residual toner collecting container 439, and the intermediate transfer unit 430 is delivered as necessary based on the information.

FIGS. 7A to 7F illustrate UI examples of display of the end of the lifespan of the intermediate transfer belt 435 and a case where the residual toner collecting container 439 is full. The UIs (message display) illustrated in FIGS. 7A to 7F are displayed on the operation panel 105.

Figure 7A:
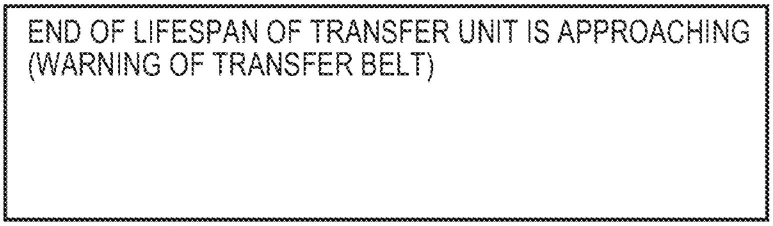
FIGS. 7A to 7F are UI examples of a lifespan display and a full state display.

FIG. 7A is a warning screen display when a warning notification of the end of the lifespan of the intermediate transfer belt 435 is issued.

Figure 7B:
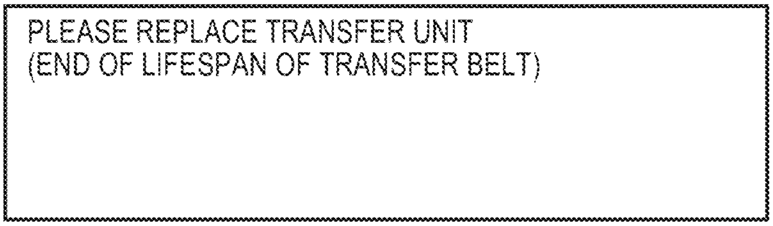

FIG. 7B is an end of lifespan screen display when an end of lifespan notification of the intermediate transfer belt 435 is issued, and is a screen displayed when printing is stopped.

Figure 7C:
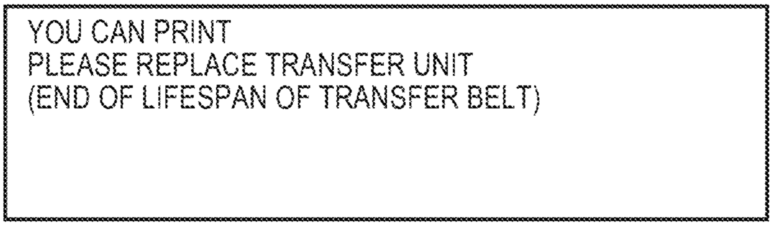

FIG. 7C is an end of lifespan screen display when an end of lifespan notification of the intermediate transfer belt 435 is issued, and is a screen displayed after the printing stop is canceled.

Figure 7D:
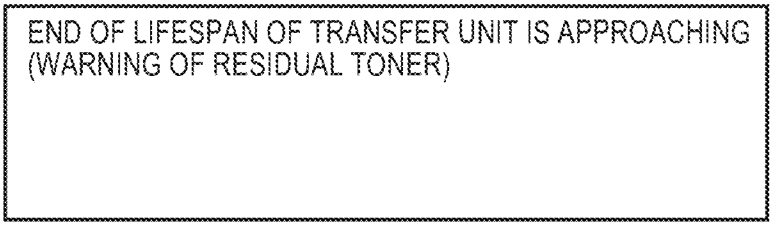

FIG. 7D is a warning screen display when a warning notification of the full state of the residual toner collecting container 439 is issued, and is a screen displayed when printing is stopped.

Figure 7E:
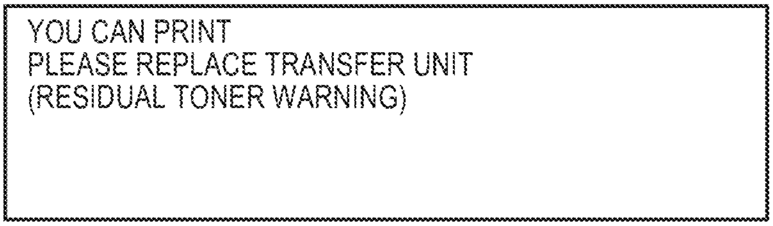

FIG. 7E is a warning screen display when a warning notification of the full state of the residual toner collecting container 439 is issued, and is a screen displayed after the printing stop is canceled.

Figure 7F:
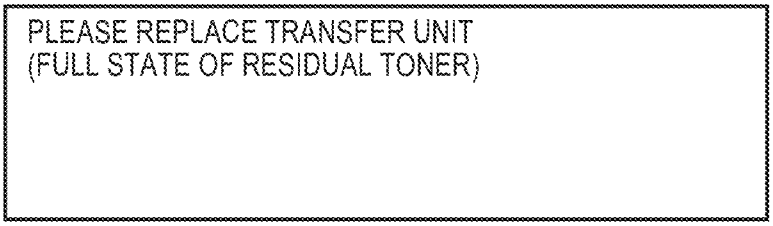

FIG. 7F is a full state screen display when a full state notification of the residual toner collecting container 439 is issued, and is a screen displayed when printing is stopped.

Note that FIGS. 7C and 7E may be displayed until the intermediate transfer unit 430 is replaced, and may be displayed as a toggle display or a list display when they occur simultaneously.

As described above, in the intermediate transfer unit 430 in which the residual toner collecting container 439 is arranged in the internal region of the intermediate transfer belt 435, it is possible to individually set the display and the operation when the intermediate transfer belt 435 reaches the end of lifespan or the full state of the residual toner collecting container occurs.

When the intermediate transfer unit 430 is generally sold, it is possible to prompt the user to purchase and replace the intermediate transfer unit 430 by setting the lifespan of the intermediate transfer belt 435 and the full state display and operation of the residual toner collecting container.

On the other hand, if the maintenance contract for consumables is signed, by periodically delivering the consumable components before the intermediate transfer belt 435 reaches the end of lifespan or the full state of the residual toner collecting container occurs, it is possible to stop the display and the operation and prevent unnecessary display and operation from being performed.

Second Embodiment

In the first embodiment, a case of being possible to individually set the operation setting when the intermediate transfer belt 435 reaches the end of lifespan or the full state of the residual toner collecting container 439 occurs.

In the second embodiment, a case of performing screen display for prompting a resolution operation of a full state of the residual toner when a warning or full state detection of the residual toner collecting container 439 occurs will be described.

Even if the lifespan of the intermediate transfer belt 435 is made longer, if printing with high density is continued, a large amount of toner is consumed, and a large amount of residual toner is also generated. Therefore, there is a case where the residual toner collecting container 439 becomes full before the intermediate transfer belt 435 reaches the end of lifespan.

As illustrated in FIG. 4, the residual toner is conveyed via the conveyance member 451 and collected in the residual toner collecting container 439. The full state of the residual toner collecting container 439 is detected by detecting a slow rotation of the conveyance member 451 or a deceleration of the intermediate transfer belt 435. When the residual toner is unevenly collected in a partial area of the residual toner collecting container 439, even if there is a free space in the residual toner collecting container 439, there is a case where the rotation of the conveyance member 451 slows down and it is detected that the residual toner collecting container 439 is in a full state. Therefore, it is not possible to judge whether the residual toner collecting container 439 is actually full of the residual toner or whether there is still a free space in the residual toner collecting container 439.

In the second embodiment, before detecting that the intermediate transfer belt 435 reaches the end of lifespan, slowing of the rotation of the conveyance member 451 of the residual toner collecting container 439 is detected, and if there is a warning notification or a full state notification, it is judged that there is still a free space in the residual toner collecting container 439.

Processing when the full state of the residual toner collecting container 439 is detected in the second embodiment will be described with reference to the flowchart of FIGS. 8A to 8C. Note that in the second embodiment, the hardware configuration of the device as a premise is similar to that of the first embodiment. The description of the same configuration as that of the first embodiment will be omitted.

Figure 8A:
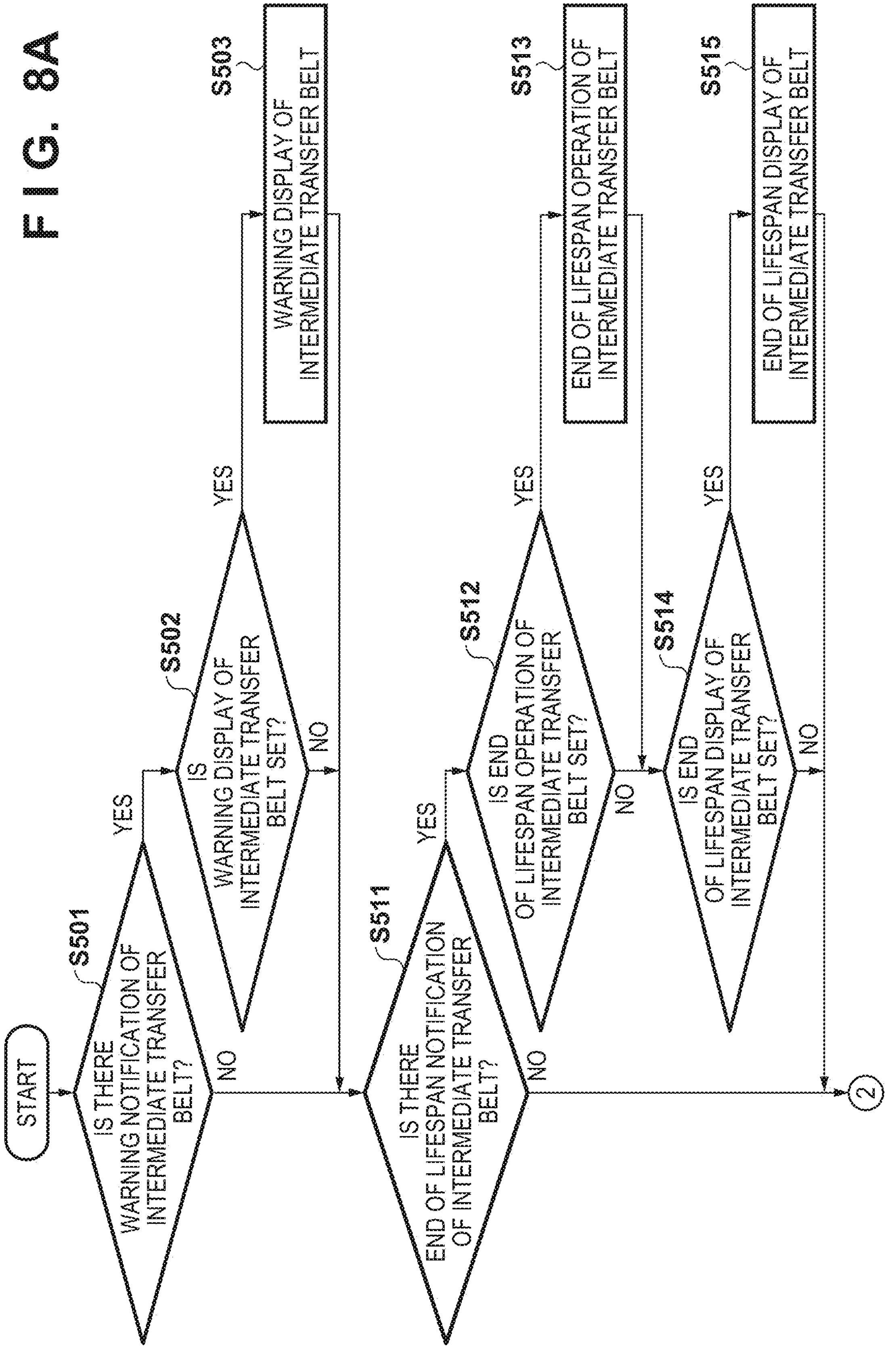
FIGS. 8A to 8C together form a single flowchart of the second embodiment.
Figure 8B:
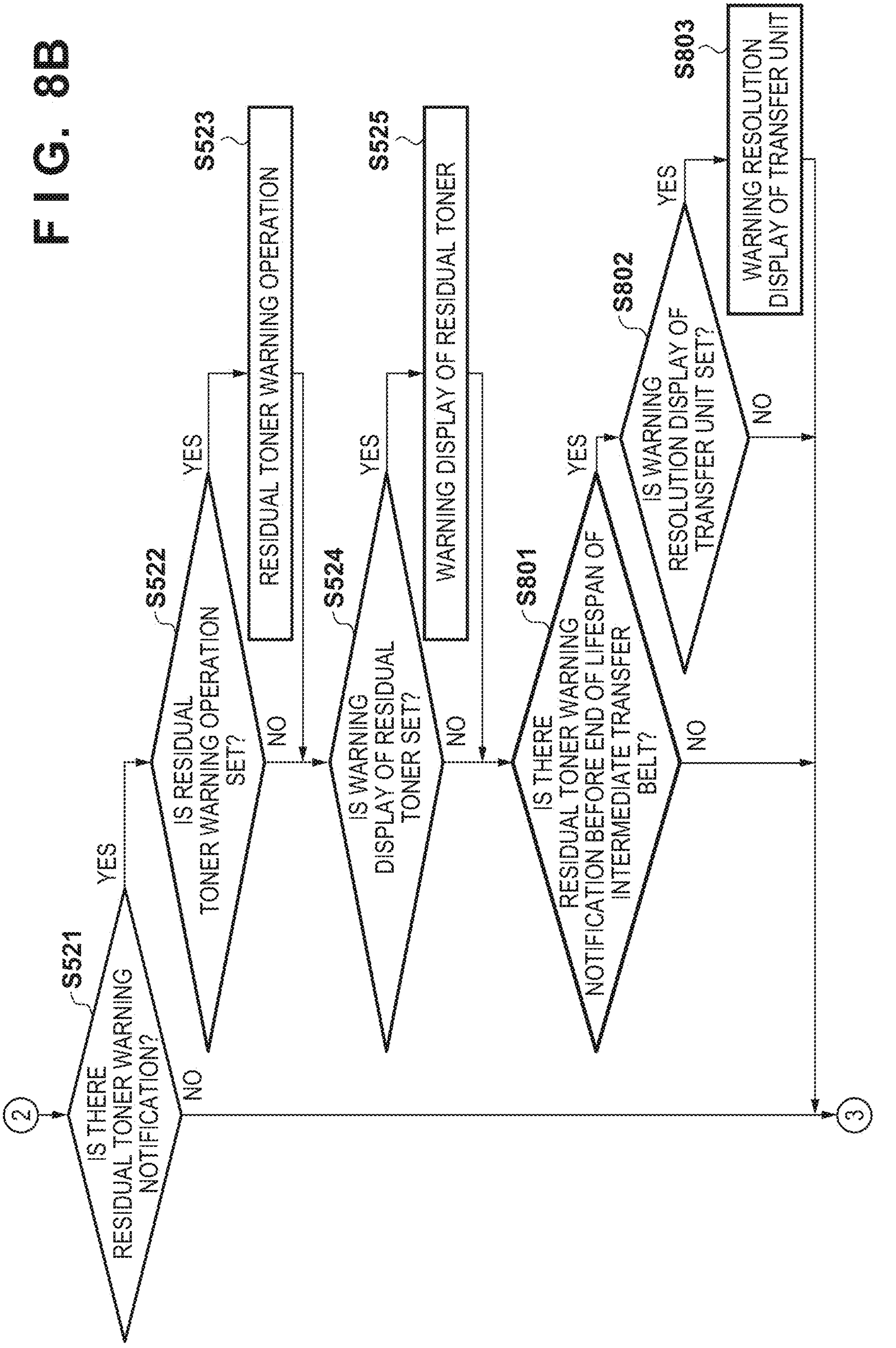
Figure 8C:
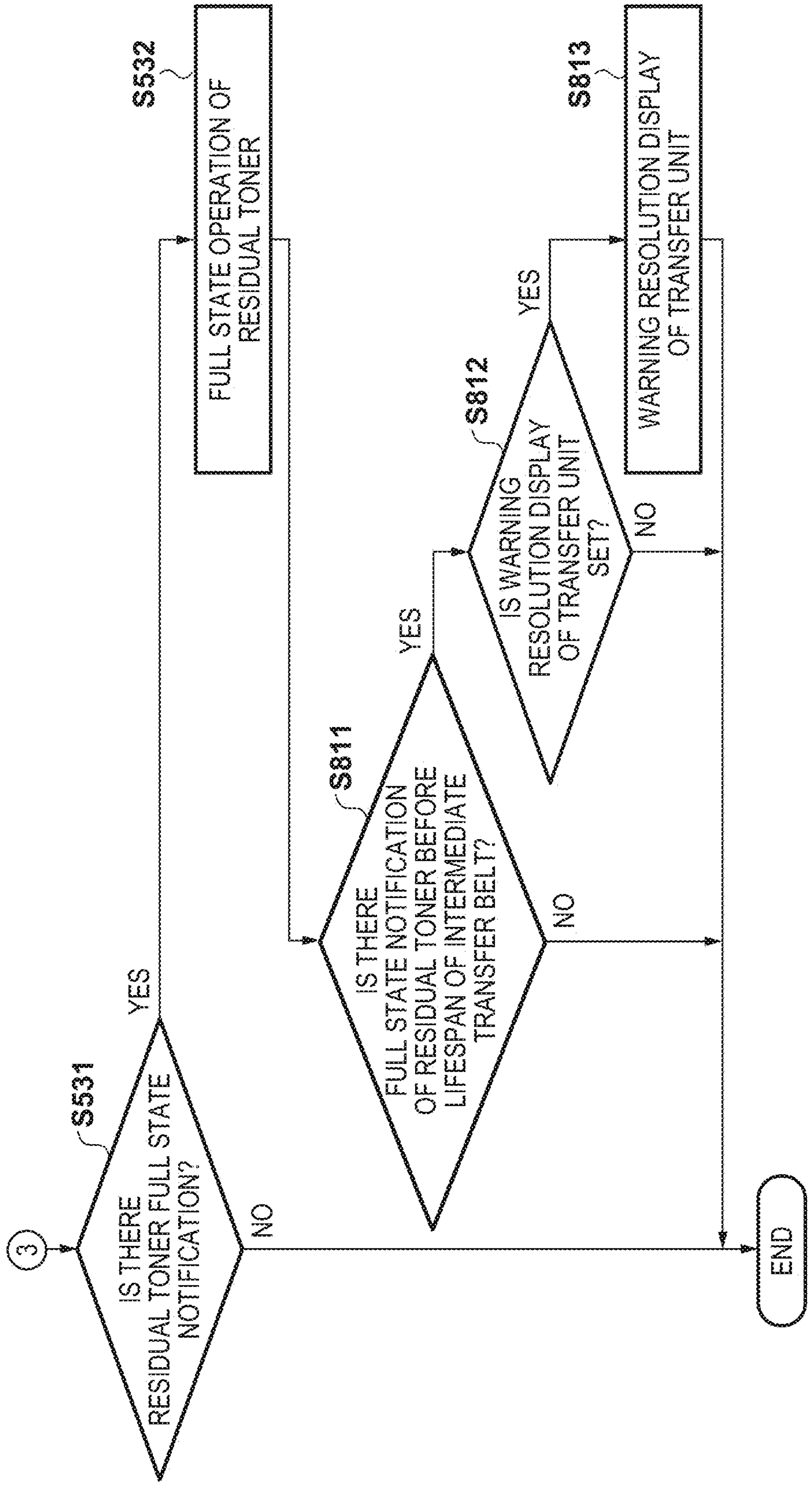

The control shown in the flowchart shown in FIGS. 8A to 8C is implemented in the controller 103 by the CPU 201 developing a control program stored in the ROM 202 into the RAM 203 and executing the control program.

Figure 5A:
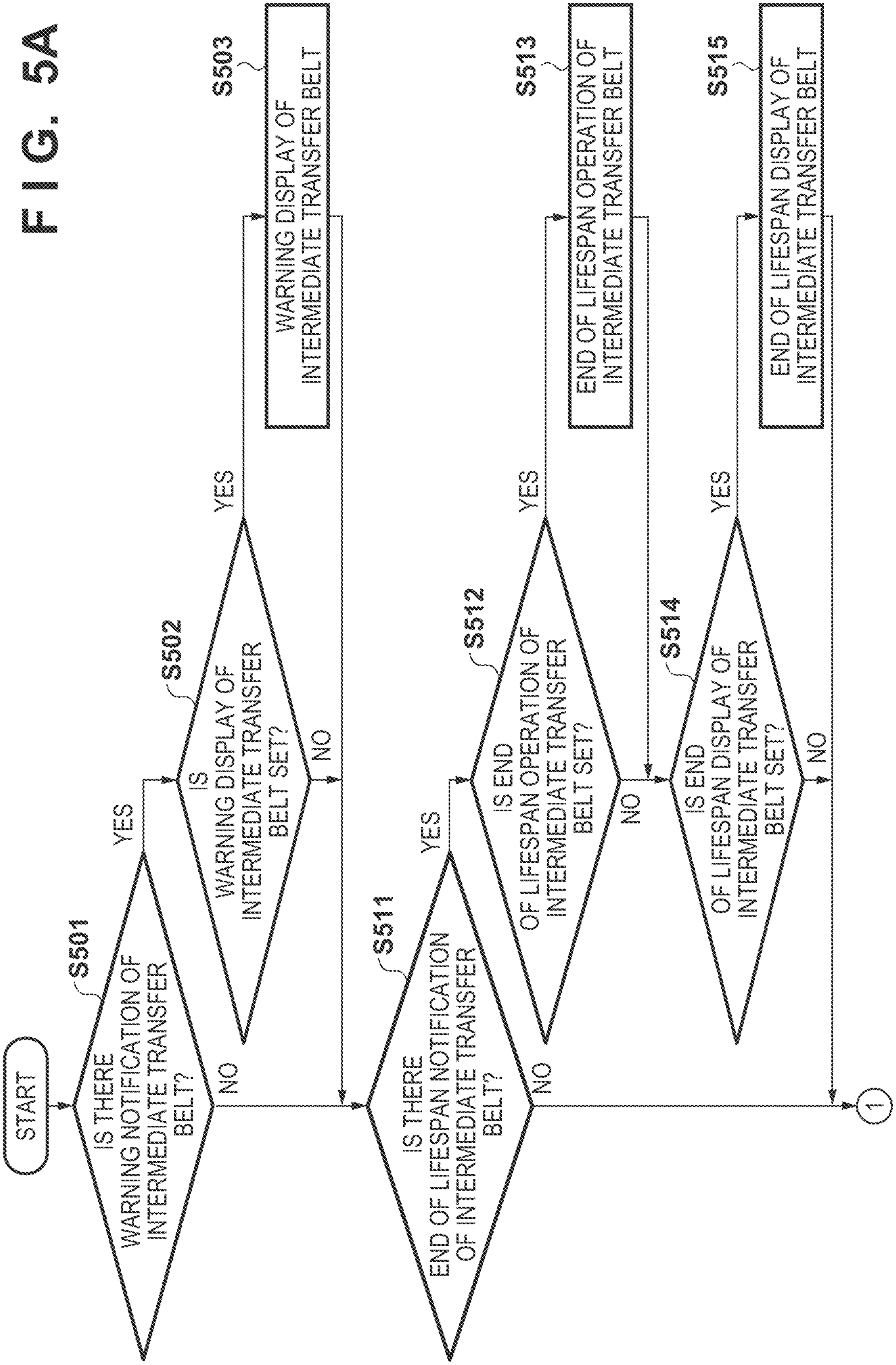
FIGS. 5A and 5B together form a single flowchart of the first embodiment.
Figure 5B:
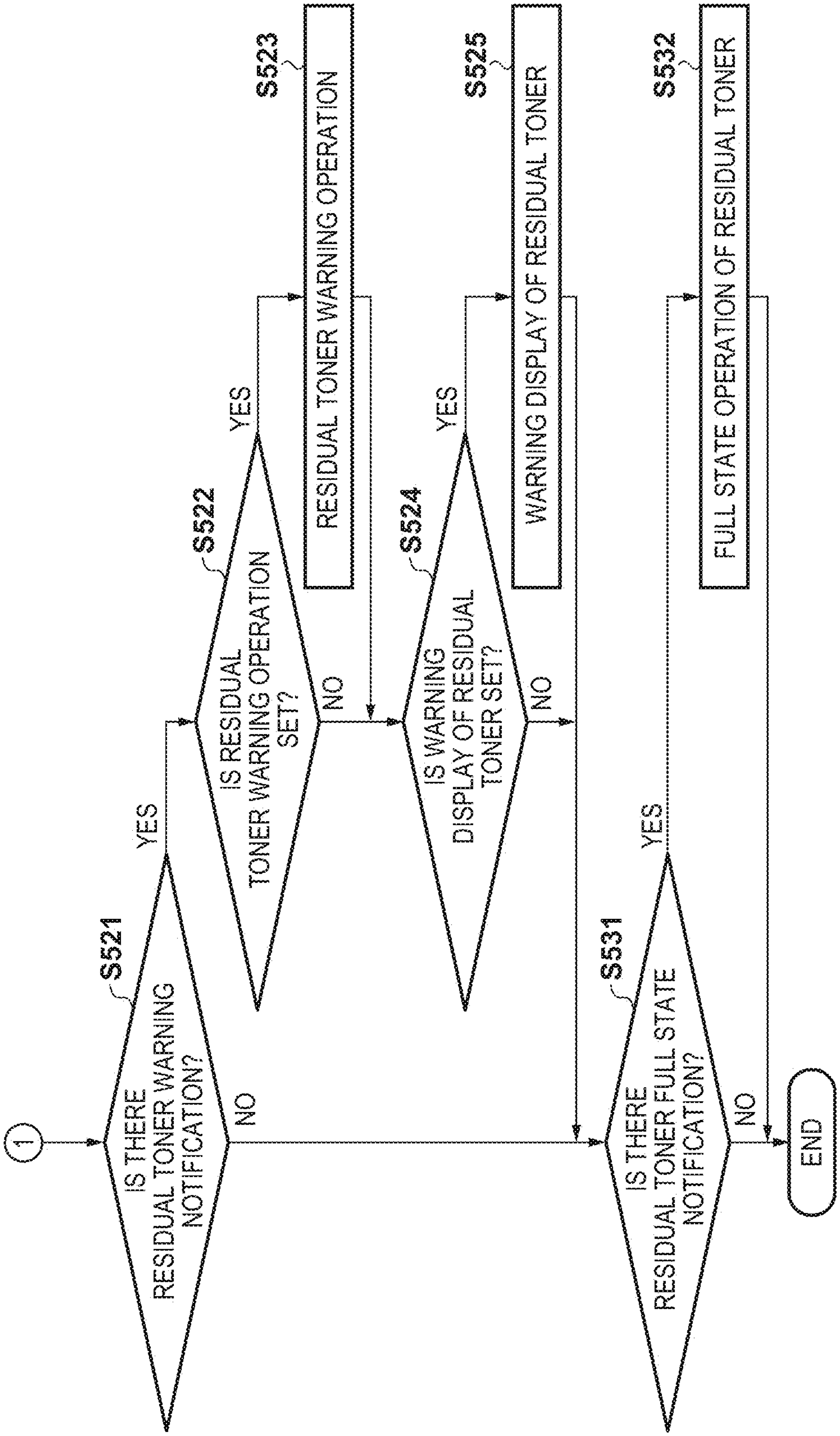

The processing from S501 to S532 in the flowchart of FIGS. 8A to 8C is similar to the processing of the flowchart of FIGS. 5A and 5B, and the processing of S801 to S803 and S811 to S813 is different from the processing of the flowchart of FIGS. 5A and 5B.

If there is the warning notification in "Is there residual toner warning notification?" of S521, in a case of No in "Is residual toner warning operation set?" of S524, and in a case where the processing of "warning display of residual toner" of S525 is ended, the process proceeds to S801.

In S801, the CPU 201 determines whether or not there is a warning notification of residual toner before the end of lifespan notification of the intermediate transfer belt 435. The CPU 201 proceeds to S802 if determining that the warning notification of the residual toner is issued earlier (Yes in S801), and proceeds to S531 if determining that the warning notification of the residual toner is issued later (No in S801).

In S802, the CPU 201 determines whether or not the warning resolution display of the intermediate transfer unit 430 is set. The warning resolution display is set on a setting screen illustrated in FIG. 9A described later, for example.

If the warning resolution display is set, that is, if it is determined that the warning resolution display is set to ON, the CPU 201 proceeds to S803 (Yes in S802). On the other hand, if the warning resolution display is not set, that is, if it is determined that the warning resolution display is set to OFF, the process proceeds to S531 (No in S802).

In S803, the CPU 201 controls the warning resolution display of the intermediate transfer unit 430. The CPU 201 displays, on the operation panel 105, a warning resolution display screen for prompting execution of stirring of the intermediate transfer unit 430, illustrated in FIG. 9B, for example. On the warning resolution display screen displayed on the operation panel 105, the user can perform an operation of operating a stirring function not illustrated. When the stirring function is operated, the driving roller 436 and the intermediate transfer belt 435 of the intermediate transfer unit 430 rotate for a predetermined time, whereby the conveyance member 451 rotates by receiving the driving force from the driving roller 436, and the residual toner collected in the residual toner collecting container 439 is stirred. By the operation of the stirring function, the unevenness of the residual toner in the residual toner collecting container 439 can be resolved, and the warning notification state of the residual toner full state can be resolved.

The predetermined time in which the driving roller 436 rotates is, for example, 2 to 3 minutes, but may be changeable by setting a predetermined time from the operation panel 105. The stirring function is operable at any time unless the image forming apparatus 102 is in a printing state regardless of the presence or absence of the warning resolution display in S803. Thereafter, the process proceeds to S531.

If there is a full state notification in "Is there residual toner full state notification?" of S531 (case of Yes), the process proceeds to S532, and in S532, the intermediate transfer unit 430 is replaced, and the printing stop is continued until it can be detected that the full state notification is resolved. The process proceeds to S811 in a state where the printing stop is continued. Note that in the present example, the process proceeds to S811 after S532, but the determination of S811 may be performed before S532.

In step S811, the CPU 201 determines whether there has been a full state notification of residual toner before the end of lifespan notification of the intermediate transfer belt 435. The CPU 201 proceeds to S812 if determining that the full state notification of the residual toner is issued earlier (Yes in S811), and ends the flow if determining that the full state notification of the residual toner is issued later (No in S811). In a case where the full state notification of the residual toner is issued later, the intermediate transfer belt 435 has reached the end of lifespan, and therefore the full state notification cannot be canceled unless the intermediate transfer unit 430 is replaced.

In S812, the CPU 201 determines whether or not the warning resolution display of the intermediate transfer unit 430 is set. The setting of the warning resolution display is performed through the operation of the operation panel 105, and is set on the setting screen illustrated in FIG. 9A described later, for example. If determining in S812 that the warning resolution display is set, that is, the warning resolution display is set to ON, the CPU 201 proceeds to S813 (Yes in S812). On the other hand, if determining that the warning resolution display is not set, that is, the warning resolution display is set to OFF, the CPU 201 ends the flow (No in S812).

In S813, the CPU 201 controls the warning resolution display of the intermediate transfer unit 430. The CPU 201 controls the operation panel 105 so as to display a warning resolution display screen illustrated in FIG. 9C described later, for example. The warning resolution display screen is a display screen that prompts the user to take out the intermediate transfer unit 430 from the image forming apparatus 102, shake it right and left, and then remount it. When the warning resolution display screen is displayed, the user takes out the intermediate transfer unit 430 from the image forming apparatus 102, manually shakes it left and right, and then remounts it. This diffuses and uniformizes the residual toner unevenly collected in a partial area of the residual toner collecting container 439. An object is to resolve slow rotation of the conveyance member 451 in the residual toner collecting container 439 and to resolve the detection state of the full state of the residual toner collecting container 439 by manually shaking.

In S803, the stirring operation of the residual toner is automatically executed, and in S813, in order to further strengthen the stirring of the residual toner, the operation that the user takes out the intermediate transfer unit 430 and manually shakes it is prompted.

Figure 9A:
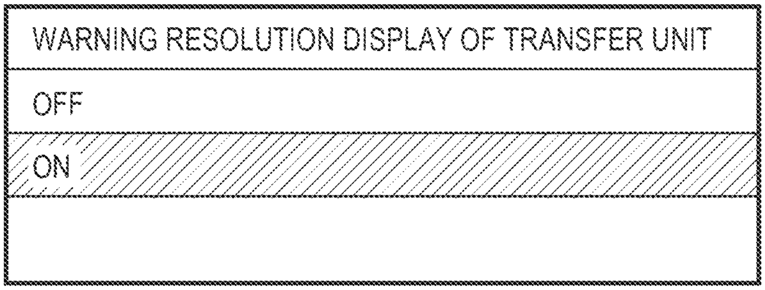
FIGS. 9A to 9C are UI examples of display setting and warning resolution display of the second embodiment.
Figure 9B:
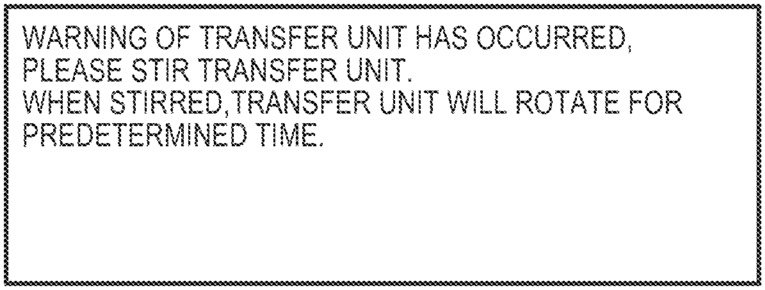
Figure 9C:
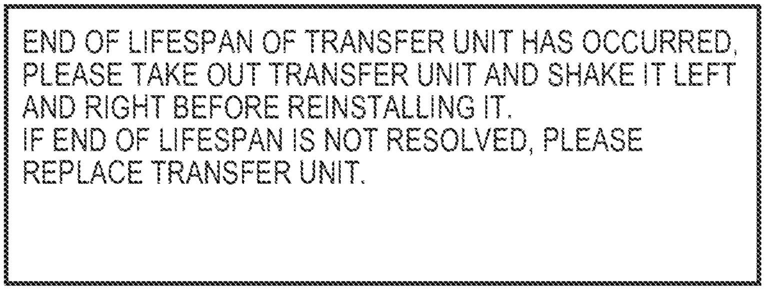

FIGS. 9A to 9C illustrate UI examples of screen display prompting operations of the warning resolution setting and the warning resolution in a case of warning detection of a full state or full state detection of the residual toner collecting container. Each UI (setting screen) illustrated in FIGS. 9A to 9C is displayed on the operation panel 105.

FIG. 9A is a setting for judging that there is still a free space in the residual toner collecting container 439 and displaying the warning resolution screen when the warning notification and the full state notification of the residual toner are detected before the end of lifespan notification of the intermediate transfer belt 435. FIG. 9A illustrates a state in which "ON" is selected. FIG. 9B is a warning resolution screen display for prompting the operation of the stirring function of the intermediate transfer unit 430. FIG. 9C is a warning resolution screen display for prompting the operation of taking out and shaking the intermediate transfer unit 430. Note that FIGS. 9B and 9C are displayed until the detection state of the full state of the residual toner collecting container 439 is resolved, and may be displayed as a toggle display or a list display when they occur simultaneously with FIGS. 7C and 7E.

As described above, when the warning notification and the full state notification of the residual toner are detected before the end of lifespan notification of the intermediate transfer belt 435, it is judged that there is still a free space in the residual toner collecting container 439. Then, in order to resolve the state of the warning notification or the full state notification, it is possible to diffuse the residual toner unevenly collected in a partial area of the collecting container and to prompt the operation of resolving the state of the warning notification of the full state or the full state notification.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-059138, filed Apr. 1, 2024, which is hereby incorporated by reference herein in its entirety.

What is claimed is:

1. An image forming apparatus comprising:

an intermediate transfer unit including an intermediate transfer belt and a residual toner collecting container;

a belt monitoring unit configured to detect a condition of the lifespan of the intermediate transfer belt;

a full state detection unit configured to detect a full state of the residual toner collecting container; and a control unit configured to control an operation of the image forming apparatus based on detection of a full state of the residual toner collecting container by the full state detection unit before the belt monitoring unit detects reaching of an end of the lifespan of the intermediate transfer belt, wherein the operation of the image forming apparatus includes continuation or stopping of printing.

2. The image forming apparatus according to claim 1, wherein the operation of the image forming apparatus includes displaying an indication that the intermediate transfer unit is approaching the end of its lifespan.

3. The image forming apparatus according to claim 1, wherein the operation of the image forming apparatus includes displaying a message prompting replacement of the intermediate transfer unit.

4. The image forming apparatus according to claim 1, wherein the operation of the image forming apparatus includes displaying a message prompting execution of a stirring operation in the intermediate transfer unit.

5. The image forming apparatus according to claim 1, wherein the operation of the image forming apparatus includes displaying a message prompting a user to remove and shake the intermediate transfer unit.

6. The image forming apparatus according to claim 1, further comprising a setting unit configured to set whether or not to control the operation of the image forming apparatus.

7. The image forming apparatus according to claim 1, wherein the control unit issues a warning before the belt monitoring unit detects that the intermediate transfer belt reached an end of the lifespan.

8. The image forming apparatus according to claim 1, wherein the control unit issues a warning before the full state detection unit detects the full state of the residual toner collecting container.

9. The image forming apparatus according to claim 1, wherein the residual toner collecting container is provided within an inner peripheral region of the intermediate transfer belt.

10. A control method for an image forming apparatus comprising a removable intermediate transfer unit including an intermediate transfer belt and a residual toner collecting container, the method comprising:

detecting a condition of the lifespan of the intermediate transfer belt;

detecting a full state of the residual toner collecting container; and controlling an operation of the image forming apparatus based on detection of a full state of the residual toner collecting container before detection of reaching of an end of the lifespan of the intermediate transfer belt, wherein the operation of the image forming apparatus includes continuation or stopping of printing.

11. A non-transitory computer-readable storage medium, the storage medium storing a program for causing a computer to execute each step of a method of controlling an image forming apparatus comprising a removable intermediate transfer unit including an intermediate transfer belt and a residual toner collecting container, the method comprising:

detecting a condition of the lifespan of the intermediate transfer belt;

detecting a full state of the residual toner collecting container; and controlling an operation of the image forming apparatus based on detection of a full state of the residual toner collecting container before detection of reaching of an end of the lifespan of the intermediate transfer belt, wherein the operation of the image forming apparatus includes continuation or stopping of printing.

* * * * *